(12) United States Patent
Garakani et al.

(10) Patent No.: US 6,578,087 B1
(45) Date of Patent: Jun. 10, 2003

(54) DETERMINING A PATH THROUGH A MANAGED NETWORK

(75) Inventors: Mehryar K. Garakani, Los Angeles, CA (US); Kenneth E. Mueller, II, Santa Barbara, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/439,153

(22) Filed: Nov. 12, 1999

(51) Int. Cl.[7] .............................................. G06F 13/00
(52) U.S. Cl. ....................... 709/242; 709/220; 709/249; 370/238; 370/401
(58) Field of Search ............................... 709/220, 221, 709/222, 223, 224, 226, 230, 238, 239, 242, 249, 245; 370/238, 351, 392, 401

(56) References Cited

U.S. PATENT DOCUMENTS

| | | | | |
|---|---|---|---|---|
| 5,361,256 A | * | 11/1994 | Doeringer et al. | 370/60 |
| 5,835,720 A | * | 11/1998 | Nelson et al. | 709/224 |
| 5,845,097 A | * | 12/1998 | Trehus | 709/242 |
| 6,052,718 A | * | 4/2000 | Gifford | 709/219 |
| 6,347,078 B1 | * | 2/2002 | Narvaez-Guarnieri et al. | 370/230 |

* cited by examiner

Primary Examiner—Viet D. Vu
(74) Attorney, Agent, or Firm—Hickman Palermo Truong & Becker LLP

(57) ABSTRACT

A method and apparatus that provides for determining a packet transmission path for a managed network using Internet Protocol is disclosed. A network management station can use a source-routed IP path tracing operation to determine a packet transmission path for a managed network even when an end-station from which the packet emanates (source node) in the managed network does not support source-routed IP path tracing operation by determining a first gateway used by the source node to reach the packet's destination (destination node). Further, a second gateway is determined based on the first gateway and destination node. The second gateway is used as the first hop from the source node to the destination node when the subnet associated with the source node is identical to the subnet associated with the second gateway.

43 Claims, 6 Drawing Sheets

DETERMINING A PATH THROUGH A MANAGED NETWORK

FIELD OF THE INVENTION

The present invention generally relates to management of computer networks, and relates more specifically to determining a path through a managed network.

BACKGROUND OF THE INVENTION

A computer network generally includes a number of devices, including switches, routers and hubs, connected so as to allow communication among the devices. The devices within a network are often categorized into two classes: end stations such as workstations, desktop PCs, printers, servers, hosts, fax machines, and devices that primarily supply or consume information; and intermediate network devices such as gateways, switches and routers that primarily forward information between the other devices. A network management station may be used to monitor and manage the network. Typically, the network management station is a workstation that runs a network management software program. An example of a network management software program is CiscoWorks 2000, commercially available from Cisco Systems, Inc.

Sometimes, the configuration of the network or an error in the network can prevent information from being forwarded correctly. For example, an end-station such as a desktop PC may send data to a specified printer in the computer network but the data does not reach the specified printer due to the configuration of the network or an error in the network or because the printer does not support the same network protocol as that of the desktop PC. In order to determine the problem in the network, tools and techniques are needed to gather information about errors and configuration. One technique of gathering information about computer networks that use Internet Protocol is path tracing ("IP path tracing"). IP path tracing involves tracing the path that a packet would take starting at a source end-station, such as the desktop PC, to reach its destination such as the printer.

An example of a tool for IP path tracing is the "traceroute" software program that is supported by UNIX-based network computers. Windows-based network computers support a similar software program called "tracert". Both traceroute and tracert record the path or route comprising specific gateway computers or routers at each "hop" through the computer network between a source computer and the destination computer. In a packet-switching network, a hop is the next intermediate gateway that a packet visits on its way to its destination. The traceroute program works by sending a small packet of data using Internet Control Message Protocol to the destination end-station. The packet includes a time limit value known as "time to live" that is designed to be exceeded by the first gateway that receives the packet. In turn, the gateway returns a Time Exceeded message. The traceroute program increases the time limit value and resends the packet so that it will reach the next gateway in the path to the packet's destination.

However, while many routers and network management stations support either the source-routed traceroute or source-routed tracert program, most end-stations do not. Examples of devices that neither support source-routed tracert nor source-routed traceroute are most end-stations and IP telephony equipment. IP telephony devices are devices that use Internet Protocol packet-switched connections to exchange voice, fax, and other information that have traditionally been carried over dedicated circuit-switched connections of the public switched telephone network. For those end-stations that do not support source-routed traceroute or source-routed tracert programs and are located remotely from the network management stations, IP path tracing is done by performing a direct tracert from the end-station to the packet's destination. Performing a direct tracert from the end-station is usually inconvenient for a network manager who is remotely located from the end-station.

To illustrate, consider the following scenario. Susan, in the accounting department of ACME Company, would like to print a document on printer ("D") from her desktop personal computer ("S") but is unable to do so because S and D are not connected to the same network or are configured improperly. The computer network management department of ACME uses a Network Management Station ("N") in an attempt to find the error. Assume that N is at a location remote from S and D. Further assume that S does not support the tracert program. In order for N to find the error in connectivity between S and D, N needs to perform IP path tracing between S and D using a source-routed tracert even if S does not support the source-routed tracert.

Based on the foregoing, there is a clear need for a mechanism allowing management of computer networks to determine a network path from a first device to a second device without relying on existing path tracing approaches.

In particular, there is a need for a method and mechanism that provides IP path tracing in a managed network using either source-routed traceroute or source-routed tracert program even though the source devices in the managed network neither support the source-routed traceroute nor the source-routed tracert program.

SUMMARY OF THE INVENTION

The foregoing needs, and other needs and objects that will become apparent for the following description, are achieved in the present invention, which comprises, in one aspect, a method for determining a path of a data packet in a managed network. In an embodiment, the method involves determining that a first subnet associated with a source node and a second subnet associated with a destination node are different subnets; determining a first gateway used by the source node to reach a network management node; determining a second gateway based on the first gateway and the destination node; determining whether the first subnet associated with the source node and a third subnet associated with the second gateway are identical subnets; and using the second gateway as a first hop from the source node to the destination node when the first subnet associated with the source node and the third subnet associated with the second gateway are identical.

One feature of this aspect is determining that the destination node is one hop away when the first subnet associated with the source node and the second subnet associated with the destination node are identical. According to another feature, the first gateway is used as the first hop from the source node to the destination node when the first subnet associated with the source node and the third subnet associated with the second gateway are not identical subnets.

In another feature, determining that the first subnet and second subnet are different subnets further involves determining a subnet mask associated with the source node; performing a Bitwise AND operation on the subnet mask and a first IP address associated with the source node to produce a first result; performing the Bitwise AND operation on the subnet mask and a second IP address associated with the destination node to produce a second result; and determining that the first subnet and the second subnet are different subnets when the first result is different from the second result.

In another feature, determining a subnet mask associated with the source node further involves determining a router that has an interface on the first subnet; and determining the subnet mask associated with the source node from a routing table of the router that has the interface on the first subnet. According to still another feature, determining a router further involves performing an IP path tracing operation from the network management node to the source node.

In another feature, the method further involves performing a PING operation with a record route option from the network management node to the source node. Also, performing an IP path tracing operation from the network management node to the source node further involves using a source-routed traceroute computer program to trace the IP path from the network management node to the source node. In another feature, determining the subnet mask further involves determining if there is a host route for the first IP address associated with the source node, and in response thereto, using the host route as an index for determining the subnet mask associated with the source node.

In another feature, determining the subnet mask associated with the source node further involves performing the Bitwise AND operation on a first mask and the first IP address associated with the source node to produce a first iteration result; and using the first iteration result as an index for determining the subnet mask associated with the source node when the first iteration result matches any entry in a route destination field of the routing table. According to another feature, the method further involves continuing to perform the Bitwise AND operation on a (1+N) mask and the first IP address associated with the source node to produce a (1+N) iteration result when the first iteration result does not match any entry in the route destination field of the routing table. The Bitwise AND operation on the (1+N) mask and the first IP address associated with the source node are discontinued the (1+N) iteration result is used as the index for determining the subnet mask associated with the source node when the (1+N) iteration result matches any entry in the route destination field of the routing table.

According to another aspect, a method for determining a path of a data packet in a managed network comprises the steps of determining that a first subnet associated with a source node and a second subnet associated with a destination node are different subnets; determining a set of all the routers that have an interface to the first subnet; determining for each router of the set of all routers that have an interface to the first subnet a next hop from the router to the destination node; determining whether the first subnet and a third subnet associated with the next hop from the router to the destination node are identical subnets; discounting the router as a first hop from the source node to the destination node when the first subnet and the third subnet are identical; and using the router as the first hop from the source node to the destination node when the first subnet and the third subnet are not identical.

In other aspects, the invention encompasses a computer apparatus, a computerreadable medium, and a carrier wave configured to carry out the foregoing steps.

Many other aspects and features will become apparent from the following description.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for determining a path through a managed network are disclosed. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

OPERATIONAL CONTEXT

In one embodiment, a source end-station that is part of a wide area network ("WAN") attempts to send information to a destination end-station that is also part of the WAN. Assume the WAN is a managed Internet Protocol network. A managed network may use Simple Network Management Protocol ("SMNP") to monitor and control network components. For example, a network administrator may use a Network Management Station ("NMS") to interrogate devices such as end-stations, routers, switches and bridges to determine their status and to obtain statistics about the networks to which they attach. These SNMP-compliant devices store data about themselves in Management Information Bases and return this data to the NMS that requests the information.

When a loss of IP connectivity between the source end-station and the destination end-station occurs, the NMS typically interrogates the devices in the IP path that would have been taken by a packet initiating from the source end-station to reach the destination end-station. Thus, the first step to rectifying the loss of IP connectivity is to trace the IP path between the source end-station and the destination end-station in order to identify the devices to be interrogated.

Figure 1:
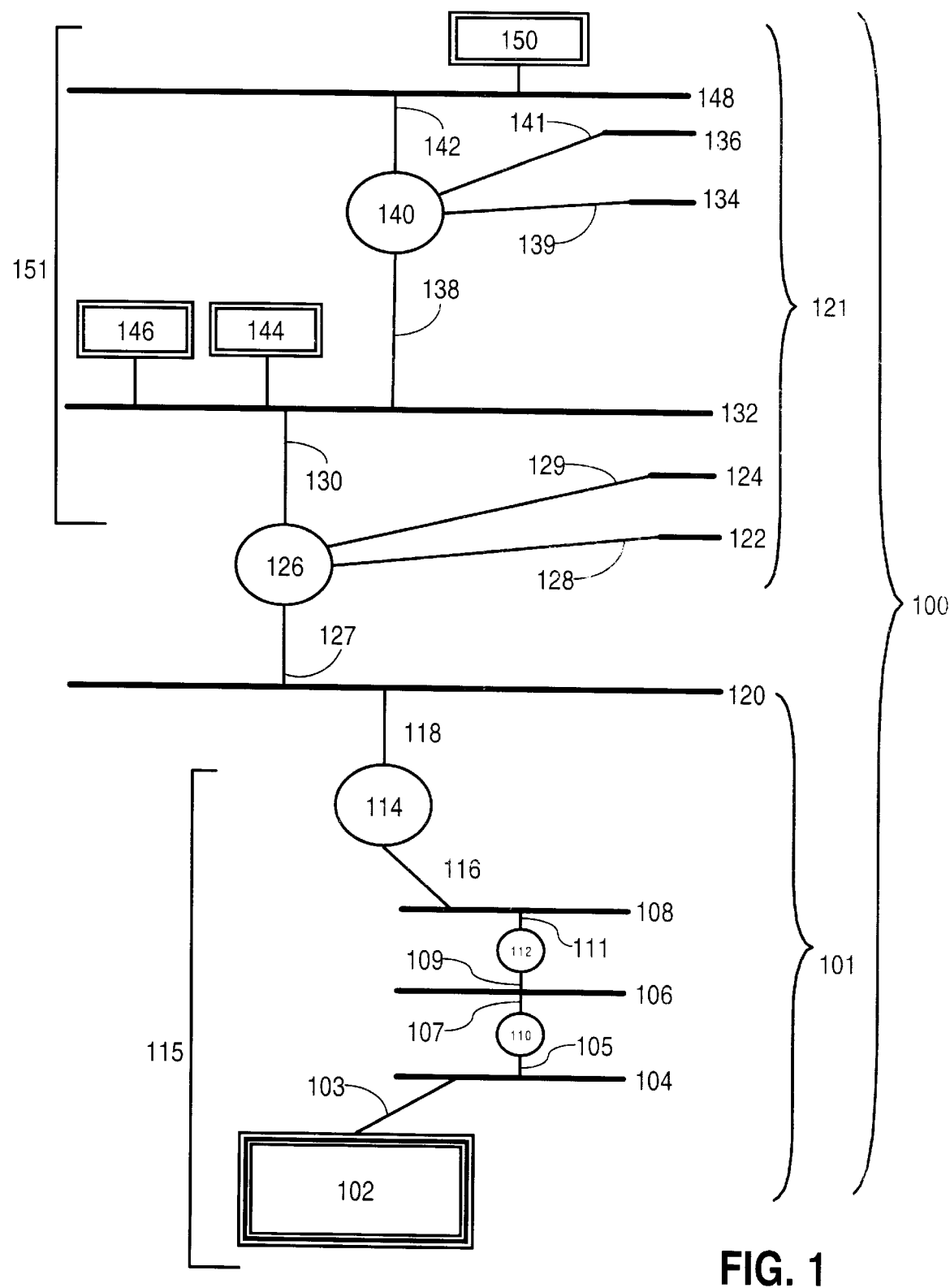
FIG. 1 is a block diagram of a system in which an embodiment may be employed.

FIG. 1 is a block diagram of a network system 100 in which an embodiment may be employed. Network system 100 is a WAN that includes a plurality of local area networks (LANs) 115, 151. LANs 115 and 151 are located in logically distinct regions such as first region 101 and second region 121, which may be geographically separate. LAN 115 comprises any number of network devices including an NMS 102, and a plurality of routers 110, 112, 114. Similarly, LAN 151 comprises any number of network devices including end-stations 144, 146, 150 and a plurality of routers 126, 140.

NMS 102 is connected to subnet 104 through interface 103. A subnet is a portion of a network that shares a common address component. In TCP/IP networks, devices whose IP addresses have the same prefix are said to be part of the same subnet. Router 110 has interfaces 105, 107 connected to subnets 104, 106 respectively. Router 112 has interfaces 109, 111 connected to subnets 106, 108 respectively. Router 114 has interfaces 116, 118 connected to subnets 108, 120 respectively. Router 126 has any number of interfaces 127, 128, 129, 130 connected to subnets 120, 122, 124, 132. Similarly, router 140 has any number of interfaces 138, 139, 141, 142 connected to subnets 132, 134, 136, 148. End-stations 144, 146 are connected to subnet 132. End-station 150 is connected to subnet 148.

Assume that end-station 146 ("source node") sends data ("IP datagram") to endstation 150 ("destination node"). Further assume that the IP datagram fails to reach the destination node due to a failure in network system 100. NMS 102 ("network management node"), which is geographically separate from the source node, attempts to trace the IP path that the IP datagram would have traversed starting at the source node to reach the destination node. To do so, assume that the network management node uses an IP path tracing computer program such as tracert but that none of the end-stations 144, 146, 150 support tracert or any other IP path tracing computer program.

IP datagrams traverse an IP network by following a path from their initial source through routers to their final destination. Determining the IP path that an IP datagram would traverse requires a process first to determine the first "hop" from the source node. Once the first hop is determined, the rest of the IP path can be determined using an IP path tracing computer program that is supported by devices in the path. The first hop is sometimes referred to as a gateway.

DETERMINING SUBNET OF DESTINATION NODE

The present invention may be implemented using various IP path tracing computer programs such as source-routed traceroute, source-routed tracert, Packet InterNet Groper ("PING"), and customized computer programs. However, for purposes of illustration, the invention is described in the context of source-routed tracert and PING.

Figure 2:
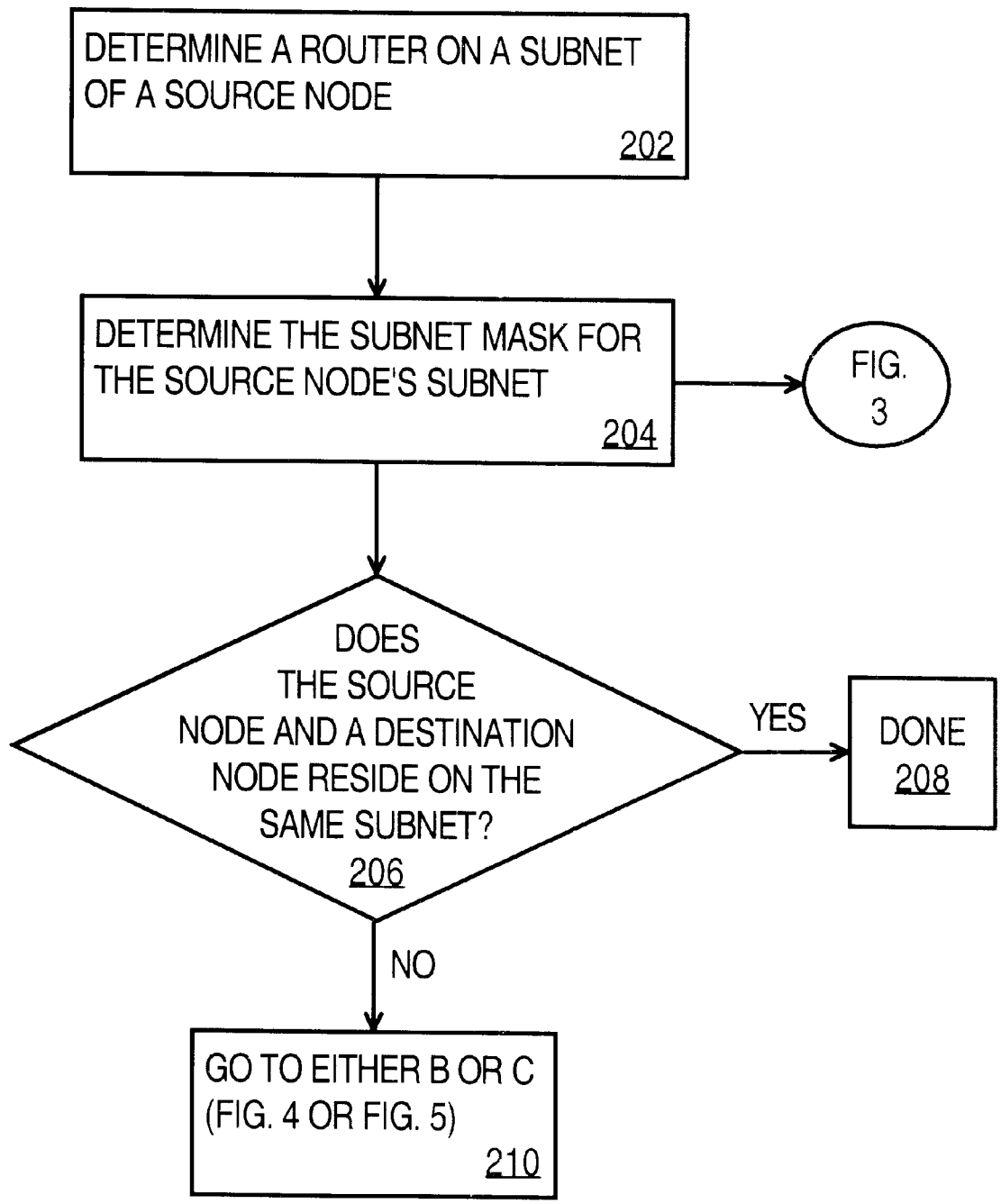
FIG. 2 is a flow chart illustrating steps for determining whether a source node and a destination node are part of the same subnet.

FIG. 2 is a flow chart illustrating steps for determining whether a source node and a destination node are part of the same subnet. If the source node and the destination node are part of the same subnet, then there are no routers (hence no hops) between the source node and the destination node. Thus, no IP path tracing is needed.

In block 202, a network administrator at a network management node, such as NMS 102 of FIG. 1, determines an identity or location of a router on the subnet of the source node, such as end-station 146, in order to identify an appropriate router. The appropriate router in this case is a router that is on the same subnet as the source node, end-station 146. Once the network management node identifies the appropriate router, the network management node may use the router's routing table for various functions detailed below.

In block 204, the network management station determines the subnet mask of the source node, end-station 146. IP networks are divided using subnet masks, which are values that can be used to identify the subnet to which an IP address belongs by performing a bitwise AND operation on the mask and the IP address. In block 206, it is determined whether the source node and the destination node are on the same subnet by performing a bitwise AND operation on the subnet mask of the source node and the IP address of the destination node. If the source node and the destination node are on the same subnet, then control passes to block 208 and the process is complete, because the destination node is the next hop from the source node. Otherwise, control passes to block 210. Block 210 in turn passes control to either block B of FIG. 4 or block C of FIG. 5, which are described below.

Figure 3:
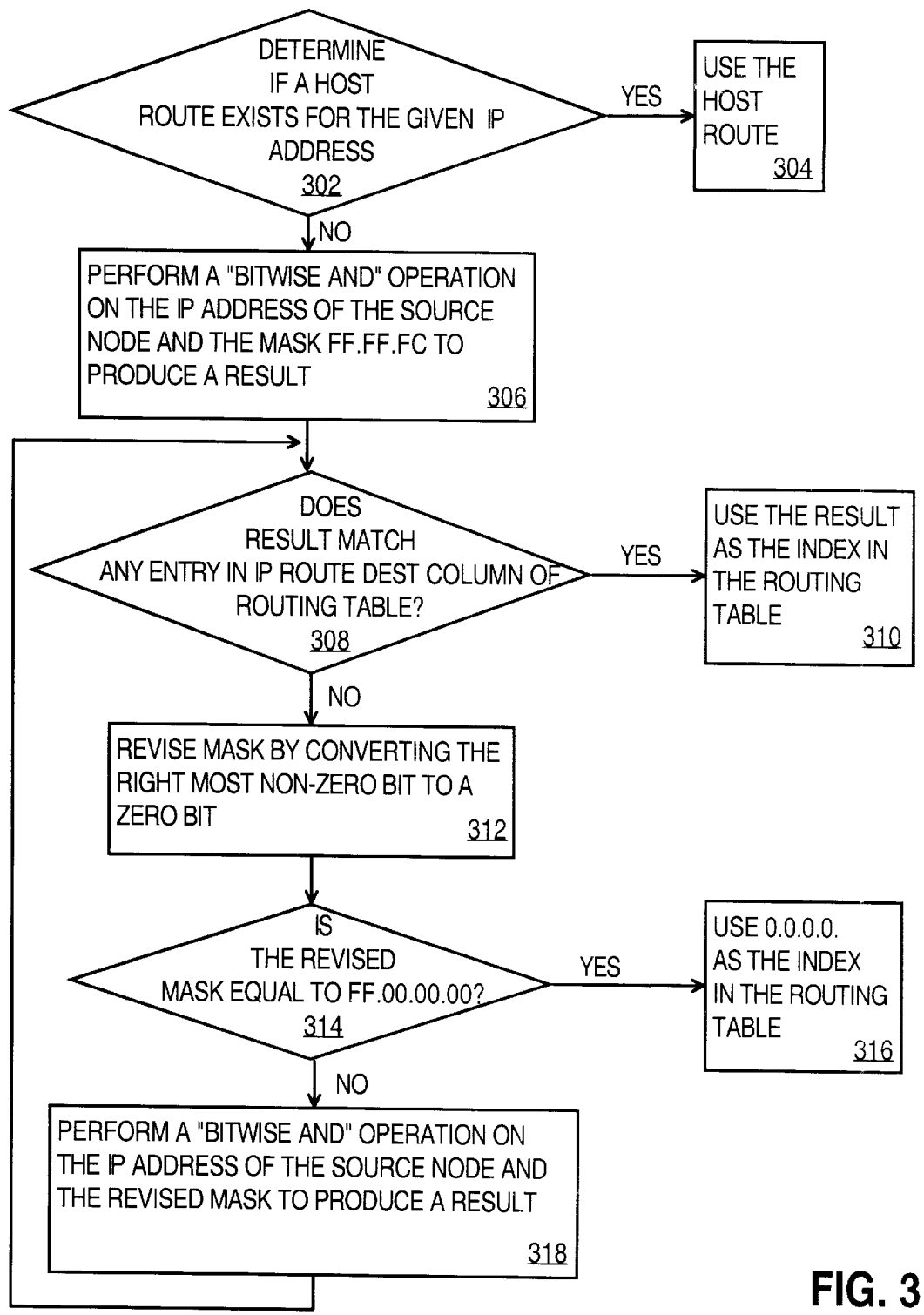
FIG. 3 is a flow chart illustrating steps for determining a subnet mask.

FIG. 3 is a flow chart illustrating the steps for determining a subnet mask by finding a matching route for a given IP address. The process of FIG. 3 may be used by a network management station to determine a subnet mask of a source node, for example, in block 204 of FIG. 2. In this case, the IP address is that of the source node.

In block 302, it is first determined if there exists a "host route" for the IP address of the source node. If there is a host route for the IP address of the source node, then control passes to block 304 and the process is complete. The host route is used as the index to find the subnet mask from the routing table. Otherwise, at block 306 the process performs a Bitwise AND operation on the IP address of the source node and the mask value FF.FF.FC to produce a first iteration In block 308, it is determined if the first iteration result of the Bitwise AND operation matches any entry in the IP Route Destination Address column of the routing table associated with the router found in block 202 of FIG. 2. If a match is found, then at block 310, the match is used as the index to find the subnet mask in the routing table. Otherwise, at block 312, the process revises the mask FF.FF.FC by converting the right most non-zero bit to a zero bit. For example, "FF.FF.FC" is revised to "FF.FF.F8". At block 314, it is determined if the revised mask is equal to FF.00.00.00. If so, then the process is complete, and at block 316, the value 0.0.0.0 is used as the index to find the subnet mask in the routing table. Otherwise at block 318, the process performs a Bitwise AND operation on the IP address of the source node and the mask from block 312 to produce the next iteration result. Control then passes back to block 308. In this manner, modifications are made to the mask, and the process performs the Bitwise AND operation on the modified mask and the IP address of the source node iteratively, until a match is found in the routing table.

To illustrate, assume Table A of the Appendix is the routing table of the router identified at block 202 of FIG. 2. Assume the IP address of the source node is "172.29.252.40". Since there is no host route for 172.29.252.40, starting with the initial mask, the value FF.FF.FC, and subsequent iterations of that value are used for performing the Bitwise AND operation on the mask and the IP address of the source node, until a match is found in the IP Route Destination Address column of Table A as follows:

172.29.252.40 & 255.255.255.252=172.29.252.40—no match is found 172.29.252.40 & 255.255.255.248=172.29.252.40—no match is found 172.29.252.40 & 255.255.255.240=172.29.252.32—a match potential is found To verify that 172.29.252.32 is a valid match, a Bitwise AND operation is performed on 172.29.252.32 and the subnet mask 255.255.255.240 (column 11, "ipRouteMask"). In this case, performing the Bitwise AND operation on 172.29.252.32 and the subnet mask 255.255.255.240 produces the same value, i.e., 172.29.252.32.

Thus, using 172.29.252.32 as the index in Table A, the subnet mask (column 11, "ipRouteMask") of the source node is found to be 255.255.255.240.

DETERMINING A FIRST HOP THAT IS LESS THAN SEVEN HOPS AWAY FROM THE SOURCE NODE

Figure 4:
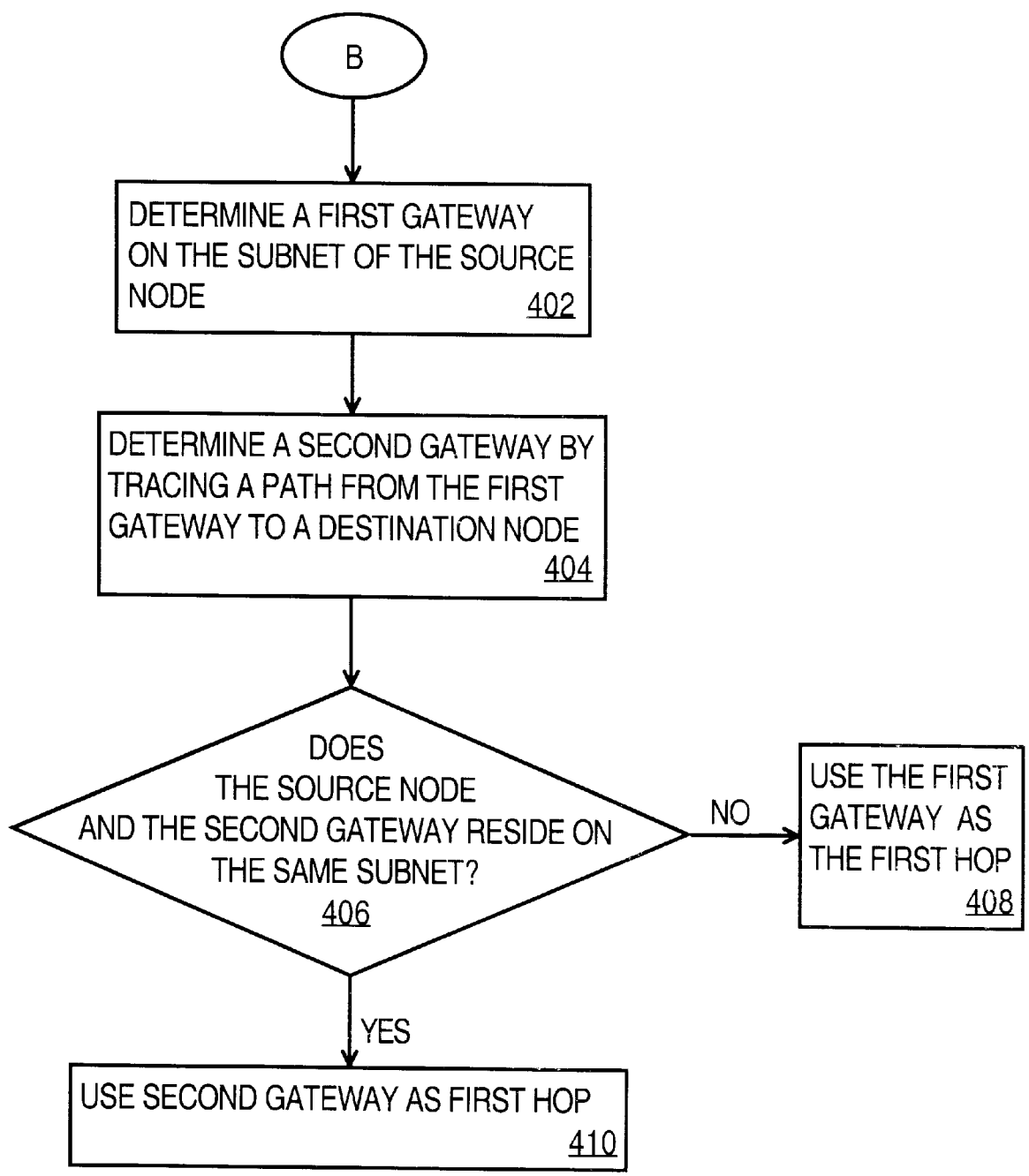
FIG. 4 is a flow chart illustrating a technique for determining the first hop that is less than seven hops from the source node.

FIG. 4 is a flow chart illustrating a technique for determining the first hop that is less than seven hops from the source node.

Figure 5:
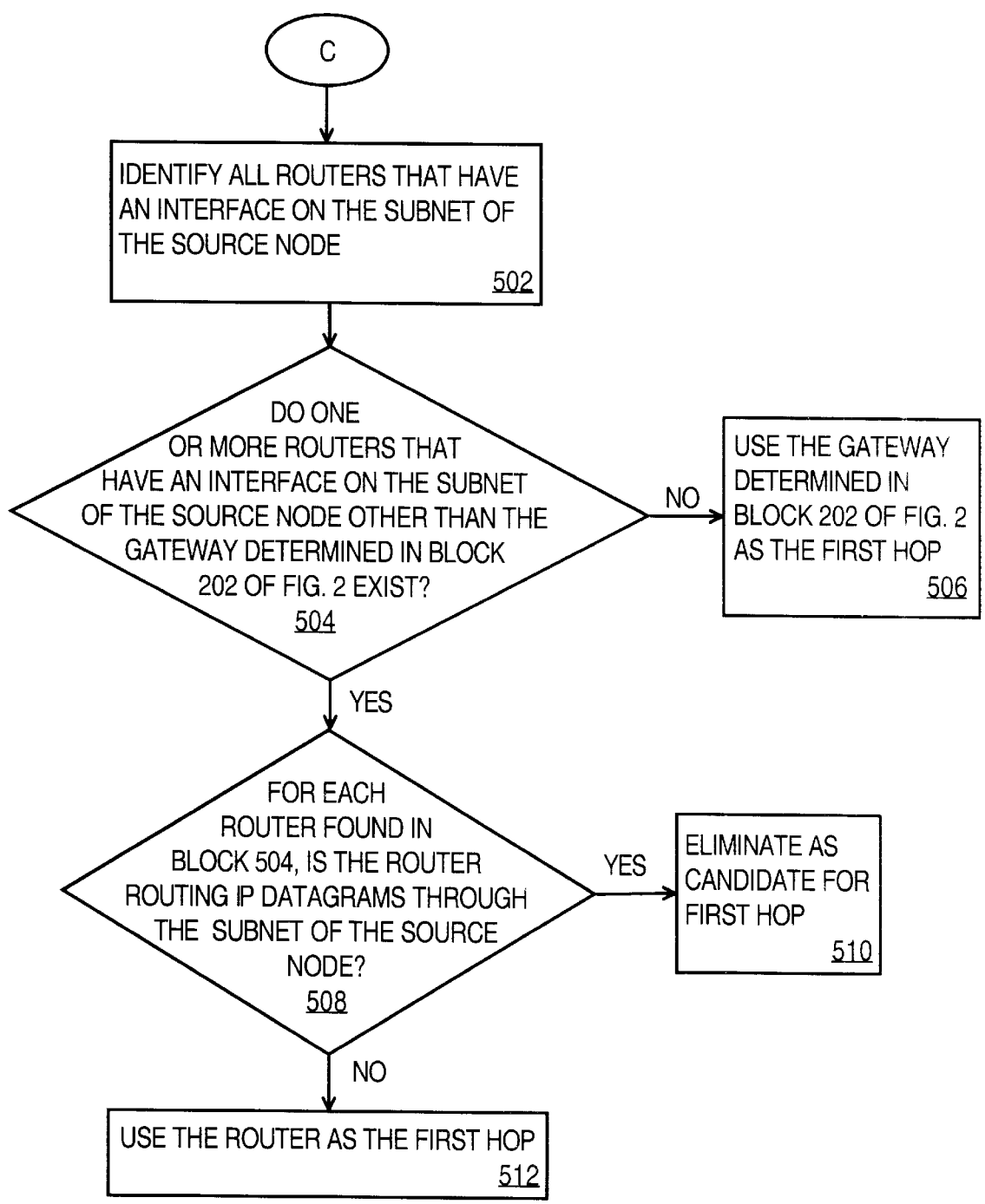
FIG. 5 is a flow chart illustrating a technique for determining the first hop that is more than seven hops from the source node.

At block 402, the network management node determines a first gateway on the subnet of the source node by performing a PING that uses the Record Route option ("PING -R") of the IP datagram, for tracing the path of the IP datagram from the network management node to the source node. For example, PING -R identifies each hop in the path of the IP datagram starting from NMS 102 to end-station 146, as well as the hops in the return path from end-station 146 to NMS 102. However, the disadvantage of using PING -R is that only the IP addresses of seven hops may be recorded in the header of the IP datagram using the Record Route option. Thus, if there are more than seven hops between the network management node and the source node, the technique of FIG. 5 is used.

The first gateway determined at block 402 may or may not be the first hop in the path of an IP datagram from the source node to the destination node. In order to determine if the first gateway is the first hop from the source node, at block 404, the network management node determines a second gateway by performing a tracert from the first gateway to the destination node.

At block 406, it is determined if the source node and the second gateway are on the same subnet. If the second gateway is on the same subnet as the source node, then at block 410, the second gateway is used as the first hop in the path from the source node to the destination node. Otherwise, at block 408, the first gateway is used as the first hop.

If the second gateway is on the same subnet as the source node, then that is an indication that the first gateway is routing IP datagrams through a router (the second gateway in our example) that has an interface on the same subnet as the source node. Thus, the first gateway is not the first hop in the path from the source node to the destination node. Rather, the second gateway is the first hop.

To illustrate, assume that a PING -R command is issued from NMS 102 to end-station 146 that has an IP address of 179.29.252.40, using the command C:\>PING -R 9-N 1 172.29.252.40, and produces the following results:

Pinging 172.29.252.40 with 32 bytes of data:
Reply from 172.29.252.40: bytes=32 time=11 ms TTL=28
   Route: 171.69.187.33→
      172.29.252.1→
      172.29.252.82→
      172.29.252.33→
      172.29.252.40→ ←This is the source node
      172.29.252.81→ ←This is the first gateway
      172.29.252.2→
      171.69.187.36→
      171.69.185.1

The device having an IP address of "171.29.252.81" is the first gateway because it is the first device on the return path to NMS 102 from end-station 146 (i.e., 172.29.252.40) recorded as a result of the PING -R. Further assume that the network management node, NMS 102, performs a tracert from the first gateway, whose IP address is 172.29.252.81 as determined above, to the destination node, end-station 150, whose IP address is 172.29.252.49.

Thus,
C:\>TRACERT -J 172.29.252.81 172.29.252.49
produces the following results:
Tracing route to PREINSTALLEDCOM [172.29.252.49] over a maximum of 30 hops:
  1 <10 ms <10 ms <10 ms sb-eng-1.cisco.com [171.69.185.1]
  2 <10 ms <10 ms <10 ms sb-eng-lab-1.cisco.com [171.69.187.36]
  3 <10 ms 10 ms <10 ms sb-1605-1.cisco.com [172.29.252.2]
  4 <10 ms 10 ms <10 ms sb-rsm-1.cisco.com [172.29.252.81]←first gateway
  5 <10 ms 10 ms 10 ms sb-4500-1.cisco.com [172.29.252.34]←second gateway
  6 10 ms 10 ms 10 ms PREINSTALLEDCOM [172.29.252.49]
Trace complete.

As indicated above, the second gateway has IP address of 172.29.252.34. In order to determine if the second gateway is on the same subnet as that of the source node, the result of performing a bitwise AND operation on the second gateway's IP address and the subnet mask of the source node is compared to the result of performing a bitwise AND operation on the source node's IP address and the subnet mask of the source node. If the two results are identical, then the second gateway is said to reside on the same subnet as that of the source node. Thus, the second gateway is the first hop. The bitwise AND operation is as follows:

Second gateway's IP address ANDed with source node's subnet mask:
   172.29.252.34 & 255.255.255.240=172.29.252.32
Source node's IP address ANDed with source node's subnet mask:
   172.29.252.40 & 255.255.255.240=172.29.252.32

As indicated above, the results of both bitwise AND operations are identical. Thus, the second gateway, whose IP address is 172.29.252.34, is the first hop.

Once the first hop has been determined, the network management node can determine the rest of the path by performing a tracert from the first hop to the destination node.

Thus,
C:\>TRACERT -J 172.29.252.34 172.29.252.49
produces the following results:
Tracing route to PREINSTALLEDCOM [172.29.252.49] over a maximum of 30 hops:
  1 <10 ms <10 ms <10 ms sb-eng-1.cisco.com [171.69.185.1]
  2 <10 ms <10 ms <10 ms sb-eng-lab-1.cisco.com [171.69.187.36]
  3 <10 ms 10 ms <10 ms sb-1605-1.cisco.com [172.29.252.2]
  4 <10 ms 10 ms <10 ms sb-rsm-1.cisco.com [172.29.252.81]
  5 <10 ms 10 ms 10 ms sb-4500-1.cisco.com [172.29.252.34]←2nd gateway ($1^{st}$ hop)
  6 10 ms 10 ms 10 ms PREINSTALLEDCOM [172.29.252.49]←destination node
Trace complete.

Thus, the complete path from source node, end-station 146, to destination node, end-station 150 is as follows:
172.29.252.40 to 171.29.252.34 to 172.29.252.49

In the case where there are more than seven hops between the network management node and the source node, a different technique is used to determine the first hop, as explained below.

DETERMINING A FIRST HOP IF THERE ARE MORE THAN SEVEN HOPS BETWEEN THE NETWORK MANAGEMENT NODE AND THE SOURCE NODE

FIG. 5 is a flow chart illustrating a process for determining the first hop when there are more than seven hops between the network management node and the source node. The process of FIG. 5 may be used irrespective of the number of hops between the network management node and the source node.

At block 502 of FIG. 5, the network management node identifies all the routers that have an interface on the subnet of the source node. Since network system 100 is a managed WAN, the network management node, NMS 102, may already possess such information. If not, NMS 102 may obtain such information through known network device discovery processes. Network management stations such as NMS 102 typically perform network discovery by fetching values in tables on the routers that form part of the network managed by the network management station. If NMS 102 does not possess information on the routers, then the information on the routers may be obtained by using an Address Resolution Protocol ("ARP") table. Table C in the Appendix of this disclosure is an example of an ARP table.

As explained above in conjunction with FIG. 3, a matching row is found for the source node in the routing table associated with the router identified at block 202 of FIG. 2. Table B in the Appendix of this disclosure is an example of a routing table associated with the router identified at block 202 of FIG. 2. In the matching row and the IP Route Interface Index column (column 2) of Table B, it can be seen that the "ifIndex" value is equal to 2 for the router identified at block 202 in FIG. 2 and which has an interface on the same subnet as that of the source node. Since a router may have multiple interfaces, apart from an IP address, each interface has an integer index known as an "ifIndex". Using the ifIndex value equal to 2, the set of routers that have an interface on the subnet of the source node may be found in the IP Net to Media Net Address column (column 3) of Table C. It is assumed that NMS 102 is able to identify routers from non-routers by simply examining the IP addresses in the IP Net to Media Net Address column of Table C.

Once the set of routers that have interfaces at the subnet of the source are identified, then at block 504, it is determined if there are any routers other than the router identified at block 202 of FIG. 2. If there are no other routers other than the router already identified at Block 202 of FIG. 2, then the process is complete and at block 506 the router identified at block 202 of FIG. 2 is used as the first hop.

Otherwise, at block 508, for each router that is found at block 504, it is determined if the router is routing IP datagrams through the subnet of the source node to reach the destination node. For our example, assume two routers are identified at block 504, namely, router 172.29.252.33 (R1) and router 172.29.252.34 (R2). In order to determine if router R1 is routing IP datagrams through subnet of the source node to reach the destination node, the network management node performs a tracert from R1 to the destination node to determine the next hop from R1. Then, it is determined if the next hop from R1 is on the same subnet as the source node. If the next hop is on the same subnet as that of the source node, then R1 is said to be routing IP datagrams through the subnet of the source node to reach the destination node.

For example, for router R1, the tracert command,
C:\>TRACERT -J 172.29.252.33 172.29.252.49
produces the following:
Tracing route to PREINSTALLEDCOM [172.29.252.49] over a maximum of 30 hops:
  1 <10 ms <10 ms <10 ms sb-eng-1.cisco.com [171.69.185.1]
  2 <10 ms <10 ms <10 ms sb-eng-lab-1.cisco.com [171.69.187.36]
  3 <10 ms 10 ms <10 ms sb-1605-1.cisco.com [172.29.252.2]
  4 <10 ms 10 ms <10 ms sb-rsm-1.cisco.com [172.29.252.81]←R1
  5 <10 ms 10 ms 10 ms sb-4500-1.cisco.com [172.29.252.34]←next hop from R1
  6 10 ms 10 ms 10 ms PREINSTALLEDCOM [172.29.252.49]
Trace complete.

Note that the IP addresses, 172.29.252.33 and 172.29.252.81, both refer to device R1 at different interfaces of R1. To see if the next hop from R1 is on the same subnet as the source node, the result of performing a bitwise AND operation on the IP address of the next hop from R1 (i.e., 172.29.252.34) and the subnet mask of the source node is compared to the result of performing a bitwise AND operation on the source node's IP address (i.e., 172.29.252.40) and the subnet mask of the source node. If the two results are identical, then the next hop from R1 is said to reside on the same subnet as that of the source node. Thus, router R1 can be eliminated as a candidate for first hop.

Note that the subnet mask (i.e., 255.255.255.240) of the source node was previously determined as explained above in conjunction with FIG. 2 and FIG. 3. Thus, the bitwise AND operation is as follows:
  172.29.252.34 & 255.255.255.240=172.29.252.32
  172.29.252.40 & 255.255.255.240=172.29.252.32

As can be seen from the above, interface 172.29.252.34 is on the same subnet as source node, hence router R1 is routing back through the subnet of the source node and is eliminated as a valid candidate for first hop. If interface 172.29.252.34 is not on the same subnet as source node, then at block 512, router R1 is used as the first hop.

Similarly, for R2, in order to determine if router R2 is routing IP datagrams through subnet of the source node to reach the destination node, the network management node performs a tracert from R2 to the destination node to determine the next hop from R2. Then, it is determined if the next hop from R2 is on the same subnet as the source node. If the next hop is on the same subnet as the source node then R2 is said to be routing IP datagrams through the subnet of the source node to reach the destination node.

For example, for router R2, the tracert command,
C:\>TRACERT -J 172.29.252.34 172.29.252.49
produces the following:
Tracing route to PREINSTALLEDCOM [172.29.252.49] over a maximum of 30 hops:
  1 <10 ms <10 ms <10 ms sb-eng-1.cisco.com [171.69.185.1]
  2 <10 ms <10 ms <10 ms sb-eng-lab-1.cisco.com [171.69.187.36]
  3 <10 ms 10 ms <10 ms sb-1605-1.cisco.com [172.29.252.2]
  4 <10 ms 10 ms <10 ms sb-rsm-1.cisco.com [172.29.252.81]
  5 <10 ms 10 ms 10 ms sb-4500-1.cisco.com [172.29.252.34]←R2

6 10 ms 10 ms 10 ms PREINSTALLEDCOM [172.29.252.49]←next hop from R2

Trace complete.

To see if the next hop from R2 is on the same subnet as the source node, the result of performing a bitwise AND operation on the IP address of the next hop from R2 (i.e., 172.29.252.49) and the subnet mask of the source node is compared to the result of performing a bitwise AND operation on the source node's IP address (i.e., 172.29.252.40) and the subnet mask of the source node. If the two results are identical, then the next hop from R2 is said to reside on the same subnet as that of the source node. Thus, router R2 can be eliminated as a candidate for first hop. Otherwise, router R2 is used as the first hop.

Thus, the bitwise AND operation is as follows:

172.29.252.49 & 255.255.255.240=172.29.252.48

172.29.252.40 & 255.255.255.240=172.29.252.32

As can be seen from above, the next hop from R2 (i.e., 172.29.252.40) is not on the same subnet as that of the source node. Thus, router R2 (i.e., 172.29.252.34) is the first hop.

HARDWARE OVERVIEW

Figure 6:
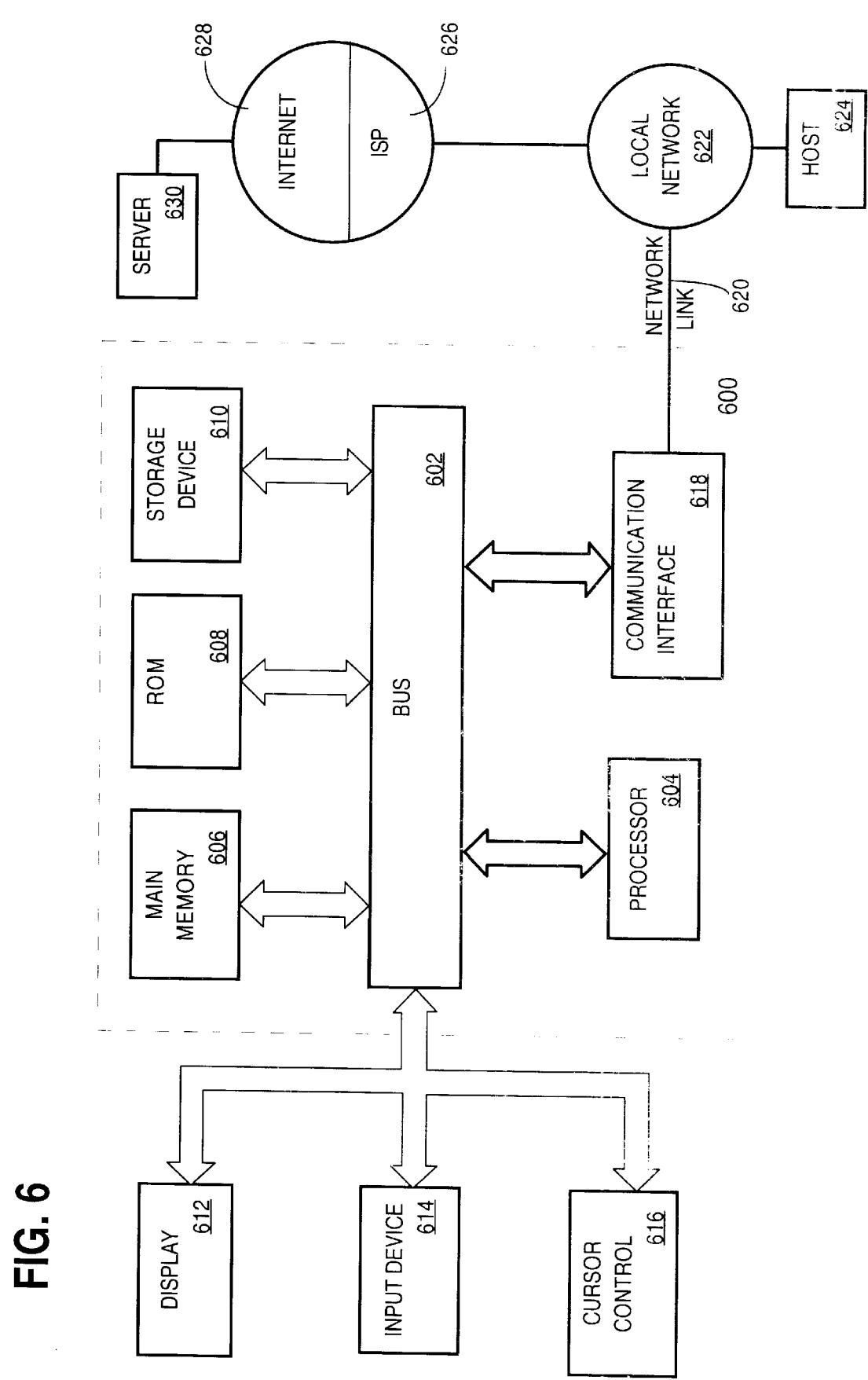
FIG. 6 is a block diagram illustrating a computer system upon which an embodiment may be implemented.

FIG. 6 is a block diagram that illustrates a computer system 600 upon which an embodiment of the invention may be implemented. In one embodiment, computer system 600 is a network switching device, such as a router.

Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as non-volatile random-access memory (NVRAM), is provided and coupled to bus 602 for storing information and instructions.

Computer system 600 may be coupled via communication interface 617 to a terminal 612, such as a cathode ray tube (CRT) dumb terminal or workstation, for receiving command-line instructions from and displaying information to a computer user. Terminal 612 includes an input device such as a keyboard, and may include a cursor control such as a mouse, a trackball, or cursor direction keys for communicating direction information and command selections to processor 604.

Computer system 600 has a switching system 616 which provides a plurality of links or interfaces to a network 622. Switching system 616 provides a way to connect an incoming network link 614 to an outgoing network link 618. There may be many links 614, 616.

The invention is related to the use of computer system 600 for regulating packet traffic in an integrated services network. According to one embodiment of the invention, regulating packet traffic in an integrated services network is provided by computer system 600 in response to processor 604 executing one or more sequences of one or more instructions contained in main memory 606. Such instructions may be read into main memory 606 from another computer-readable medium, such as storage device 610.

Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, NVRAM, such as storage device 610, or magnetic or optical disks. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 617 coupled to bus 602. Communication interface 617 provides a two-way data communication coupling to a network link 620 that is connected to a local network 622. For example, communication interface 617 may be an integrated services digital network (ISDN) card or a modem to provide a data communication connection to a corresponding type of telephone line. As another example, communication interface 617 may be a local area network (LAN) card to provide a data communication connection to a compatible LAN. Wireless links may also be implemented. In any such implementation, communication interface 617 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 617, which carry the digital data to and from computer system 600, are exemplary forms of carrier waves transporting the information.

Computer system 600 can send messages and receive data, including program code, through the network(s), network link 620 and communication interface 617. In the Internet example, a server 630 might transmit a requested code for an application program through Internet 628, ISP 626, local network 622 and communication interface 617. In accordance with the invention, one such downloaded application provides for regulating packet traffic in an integrated services network as described herein.

The received code may be executed by processor 604 as it is received, and/or stored in storage device 610, or other non-volatile storage for later execution. In this manner, computer system 600 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

TABLE A

APPENDIX

Column 1 ipRouteDest.0.0.0.0 = 0.0.0.0
ipRouteDest.127.0.0.0 = 127.0.0.0
ipRouteDest.172.29.252.0 = 172.29.252.0
ipRouteDest.172.29.252.32 = 172.29.252.32
ipRouteDest.172.29.252.48 = 172.29.252.48
ipRouteDest.172.29.252.56 = 172.29.252.56
ipRouteDest.172.29.252.64 = 172.29.252.64
ipRouteDest.172.29.252.80 = 172.29.252.80
ipRouteDest.172.29.252.96 = 172.29.252.96
ipRouteDest.172.29.252.104 = 172.29.252.104

Column 2 ipRouteIfIndex.0.0.0.0 = 0
ipRouteIfIndex.127.0.0.0 = 1
ipRouteIfIndex.172.29.252.0 = 6
ipRouteIfIndex.172.29.252.32 = 2
ipRouteIfIndex.172.29.252.48 = 2
ipRouteIfIndex.172.29.252.56 = 2
ipRouteIfIndex.172.29.252.64 = 2
ipRouteIfIndex.172.29.252.80 = 6
ipRouteIfIndex.172.29.252.96 = 8
ipRouteIfIndex.172.29.252.104 = 9

Column 3 ipRouteMetric1.0.0.0.0 = 0
ipRouteMetric1.127.0.0.0 = 0
ipRouteMetric1.172.29.252.0 = 284160
ipRouteMetric1.172.29.252.32 = 0
ipRouteMetric1.172.29.252.48 = 30720
ipRouteMetric1.172.29.252.56 = 30720
ipRouteMetric1.172.29.252.64 = 30720
ipRouteMetric1.172.29.252.80 = 0
ipRouteMetric1.172.29.252.96 = 0
ipRouteMetric1.172.29.252.104 = 0

Column 4 ipRouteMetric2.0.0.0.0 = −1
ipRouteMetric2.127.0.0.0 = −1
ipRouteMetric2.172.29.252.0 = −1
ipRouteMetric2.172.29.252.32 = −1
ipRouteMetric2.172.29.252.48 = −1
ipRouteMetric2.172.29.252.56 = −1
ipRouteMetric2.172.29.252.64 = −1
ipRouteMetric2.172.29.252.80 = −1
ipRouteMetric2.172.29.252.96 = −1
ipRouteMetric2.172.29.252.104 = −1

TABLE A-continued

APPENDIX

Column 5 ipRouteMetric3.0.0.0.0 = −1
ipRouteMetric3.127.0.0.0 = −1
ipRouteMetric3.172.29.252.0 = −1
ipRouteMetric3.172.29.252.32 = −1
ipRouteMetric3.172.29.252.48 = −1
ipRouteMetric3.172.29.252.56 = −1
ipRouteMetric3.172.29.252.64 = −1
ipRouteMetric3.172.29.252.80 = −1
ipRouteMetric3.172.29.252.96 = −1
ipRouteMetric3.172.29.252.104 = −1

Column 6 ipRouteMetric4.0.0.0.0 = −1
ipRouteMetric4.127.0.0.0 = −1
ipRouteMetric4.172.29.252.0 = −1
ipRouteMetric4.172.29.252.32 = −1
ipRouteMetric4.172.29.252.48 = −1
ipRouteMetric4.172.29.252.56 = −1
ipRouteMetric4.172.29.252.64 = −1
ipRouteMetric4.172.29.252.80 = −1
ipRouteMetric4.172.29.252.96 = −1
ipRouteMetric4.172.29.252.104 = −1

Column 7 ipRouteNextHop.0.0.0.0 = 172.29.252.82
ipRouteNextHop.127.0.0.0 = 127.0.0.4
ipRouteNextHop.172.29.252.0 = 172.29.252.82
ipRouteNextHop.172.29.252.32 = 172.29.252.33
ipRouteNextHop.172.29.252.48 = 172.29.252.34
ipRouteNextHop.172.29.252.56 = 172.29.252.34
ipRouteNextHop.172.29.252.64 = 172.29.252.34
ipRouteNextHop.172.29.252.80 = 172.29.252.81
ipRouteNextHop.172.29.252.96 = 172.29.252.97
ipRouteNextHop.172.29.252.104 = 172.29.252.105

Column 8 ipRouteType.0.0.0.0 = 4
ipRouteType.127.0.0.0 = 3
ipRouteType.172.29.252.0 = 4
ipRouteType.172.29.252.32 = 3
ipRouteType.172.29.252.48 = 4
ipRouteType.172.29.252.56 = 4
ipRouteType.172.29.252.64 = 4
ipRouteType.172.29.252.80 = 3
ipRouteType.172.29.252.96 = 3
ipRouteType.172.29.252.104 = 3

Column 9 ipRouteProto.0.0.0.0 = 2
ipRouteProto.127.0.0.0 = 2
ipRouteProto.172.29.252.0 = 11
ipRouteProto.172.29.252.32 = 2
ipRouteProto.172.29.252.48 = 11
ipRouteProto.172.29.252.56 = 11
ipRouteProto.172.29.252.64 = 11
ipRouteProto.172.29.252.80 = 2
ipRouteProto.172.29.252.96 = 2
ipRouteProto.172.29.252.104 = 2

Column 10 ipRouteAge.0.0.0.0 = 53
ipRouteAge.127.0.0.0 = 0
ipRouteAge.172.29.252.0 = 597
ipRouteAge.172.29.252.32 = 0
ipRouteAge.172.29.252.48 = 599
ipRouteAge.172.29.252.56 = 599
ipRouteAge.172.29.252.64 = 599
ipRouteAge.172.29.252.80 = 0
ipRouteAge.172.29.252.96 = 0
ipRouteAge.172.29.252.104 = 0

TABLE A-continued

APPENDIX

Column 11 ipRouteMask.0.0.0.0 = 0.0.0.0
ipRouteMask.127.0.0.0 = 255.0.0.0
ipRouteMask.172.29.252.0 = 255.255.255.224
ipRouteMask.172.29.252.32 = 255.255.255.240 ← Here is the mask (255.255.255.240)
ipRouteMask.172.29.252.48 = 255.255.255.248
ipRouteMask.172.29.252.56 = 255.255.255.248
ipRouteMask.172.29.252.64 = 255.255.255.248
ipRouteMask.172.29.252.80 = 255.255.255.248
ipRouteMask.172.29.252.96 = 255.255.255.248
ipRouteMask.172.29.252.104 = 255.255.255.248

Column 12 ipRouteMetric5.0.0.0.0 = −1
ipRouteMetric5.127.0.0.0 = −1
ipRouteMetric5.172.29.252.0 = −1
ipRouteMetric5.172.29.252.32 = −1
ipRouteMetric5.172.29.252.48 = −1
ipRouteMetric5.172.29.252.56 = −1
ipRouteMetric5.172.29.252.64 = −1
ipRouteMetric5.172.29.252.80 = −1
ipRouteMetric5.172.29.252.96 = −1
ipRouteMetric5.172.29.252.104 = −1

Column 13 ipRouteInfo.0.0.0.0 = 0.0
ipRouteInfo.127.0.0.0 = 0.0
ipRouteInfo.172.29.252.0 = 0.0
ipRouteInfo.172.29.252.32 = 0.0
ipRouteInfo.172.29.252.48 = 0.0
ipRouteInfo.172.29.252.56 = 0.0
ipRouteInfo.172.29.252.64 = 0.0
ipRouteInfo.172.29.252.80 = 0.0
ipRouteInfo.172.29.252.96 = 0.0
ipRouteInfo.172.29.252.104 = 0.0

TABLE B

Column 1 ipRouteDest.0.0.0.0 = 0.0.0.0
ipRouteDest.127.0.0.0 = 127.0.0.0
ipRouteDest.172.29.252.0 = 172.29.252.0
ipRouteDest.172.29.252.32 = 172.29.252.32
ipRouteDest.172.29.252.48 = 172.29.252.48
ipRouteDest.172.29.252.56 = 172.29.252.56
ipRouteDest.172.29.252.64 = 172.29.252.64
ipRouteDest.172.29.252.80 = 172.29.252.80
ipRouteDest.172.29.252.96 = 172.29.252.96
ipRouteDest.172.29.252.104 = 172.29.252.104

Column 2 ipRouteIfIndex.0.0.0.0 = 0
ipRouteIfIndex.127.0.0.0 = 1
ipRouteIfIndex.172.29.252.0 = 6
ipRouteIfIndex.172.29.252.32 = 2 ← ifIndex = 2 for sb-rsm-1 iface on "src" subnet
ipRouteIfIndex.172.29.252.48 = 2
ipRouteIfIndex.172.29.252.56 = 2
ipRouteIfIndex.172.29.252.64 = 2
ipRouteIfIndex.172.29.252.80 = 6
ipRouteIfIndex.172.29.252.96 = 8
ipRouteIfIndex.172.29.252.104 = 9

Column 3 ipRouteMetric1.0.0.0.0 = 0
ipRouteMetric1.127.0.0.0 = 0
ipRouteMetric1.172.29.252.0 = 284160
ipRouteMetric1.172.29.252.32 = 0
ipRouteMetric1.172.29.252.48 = 30720
ipRouteMetric1.172.29.252.56 = 30720
ipRouteMetric1.172.29.252.64 = 30720
ipRouteMetric1.172.29.252.80 = 0
ipRouteMetric1.172.29.252.96 = 0
ipRouteMetric1.172.29.252.104 = 0

TABLE B-continued

<u>Column 4</u> ipRouteMetric2.0.0.0.0 = −1
ipRouteMetric2.127.0.0.0 = −1
ipRouteMetric2.172.29.252.0 = −1
ipRouteMetric2.172.29.252.32 = −1
ipRouteMetric2.172.29.252.48 = −1
ipRouteMetric2.172.29.252.56 = −1
ipRouteMetric2.172.29.252.64 = −1
ipRouteMetric2.172.29.252.80 = −1
ipRouteMetric2.172.29.252.96 = −1
ipRouteMetric2.172.29.252.104 = −1

<u>Column 5</u> ipRouteMetric3.0.0.0.0 = −1
ipRouteMetric3.127.0.0.0 = −1
ipRouteMetric3.172.29.252.0 = −1
ipRouteMetric3.172.29.252.32 = −1
ipRouteMetric3.172.29.252.48 = −1
ipRouteMetric3.172.29.252.56 = −1
ipRouteMetric3.172.29.252.64 = −1
ipRouteMetric3.172.29.252.80 = −1
ipRouteMetric3.172.29.252.96 = −1
ipRouteMetric3.172.29.252.104 = −1

<u>Column 6</u> ipRouteMetric4.0.0.0.0 = −1
ipRouteMetric4.127.0.0.0 = −1
ipRouteMetric4.172.29.252.0 = −1
ipRouteMetric4.172.29.252.32 = −1
ipRouteMetric4.172.29.252.48 = −1
ipRouteMetric4.172.29.252.56 = −1
ipRouteMetric4.172.29.252.64 = −1
ipRouteMetric4.172.29.252.80 = −1
ipRouteMetric4.172.29.252.96 = −1
ipRouteMetric4.172.29.252.104 = −1

<u>Column 7</u> ipRouteNextHop.0.0.0.0 = 172.29.252.82
ipRouteNextHop.127.0.0.0 = 127.0.0.4
ipRouteNextHop.172.29.252.0 = 172.29.252.82
ipRouteNextHop.172.29.252.32 = 172.29.252.33
ipRouteNextHop.172.29.252.48 = 172.29.252.34
ipRouteNextHop.172.29.252.56 = 172.29.252.34
ipRouteNextHop.172.29.252.64 = 172.29.252.34
ipRouteNextHop.172.29.252.80 = 172.29.252.81
ipRouteNextHop.172.29.252.96 = 172.29.252.97
ipRouteNextHop.172.29.252.104 = 172.29.252.105

<u>Column 8</u> ipRouteType.0.0.0.0 = 4
ipRouteType.127.0.0.0 = 3
ipRouteType.172.29.252.0 = 4
ipRouteType.172.29.252.32 = 3
ipRouteType.172.29.252.48 = 4
ipRouteType.172.29.252.56 = 4
ipRouteType.172.29.252.64 = 4
ipRouteType.172.29.252.80 = 3
ipRouteType.172.29.252.96 = 3
ipRouteType.172.29.252.104 = 3

<u>Column 9</u> ipRouteProto.0.0.0.0 = 2
ipRouteProto.127.0.0.0 = 2
ipRouteProto.172.29.252.0 = 11
ipRouteProto.172.29.252.32 = 2
ipRouteProto.172.29.252.48 = 11
ipRouteProto.172.29.252.56 = 11
ipRouteProto.172.29.252.64 = 11
ipRouteProto.172.29.252.80 = 2
ipRouteProto.172.29.252.96 = 2
ipRouteProto.172.29.252.104 = 2

TABLE B-continued

Column 10 ipRouteAge.0.0.0.0 = 53
ipRouteAge.127.0.0.0 = 0
ipRouteAge.172.29.252.0 = 597
ipRouteAge.172.29.252.32 = 0
ipRouteAge.172.29.252.48 = 599
ipRouteAge.172.29.252.56 = 599
ipRouteAge.172.29.252.64 = 599
ipRouteAge.172.29.252.80 = 0
ipRouteAge.172.29.252.96 = 0
ipRouteAge.172.29.252.104 = 0

Column 11 ipRouteMask.0.0.0.0 = 0.0.0.0
ipRouteMask.127.0.0.0 = 255.0.0.0
ipRouteMask.172.29.252.0 = 255.255.255.224
ipRouteMask.172.29.252.32 = 255.255.255.240
ipRouteMask.172.29.252.48 = 255.255.255.248
ipRouteMask.172.29.252.56 = 255.255.255.248
ipRouteMask.172.29.252.64 = 255.255.255.248
ipRouteMask.172.29.252.80 = 255.255.255.248
ipRouteMask.172.29.252.96 = 255.255.255.248
ipRouteMask.172.29.252.104 = 255.255.255.248

Column 12 ipRouteMetric5.0.0.0.0 = −1
ipRouteMetric5.127.0.0.0 = −1
ipRouteMetric5.172.29.252.0 = −1
ipRouteMetric5.172.29.252.32 = −1
ipRouteMetric5.172.29.252.48 = −1
ipRouteMetric5.172.29.252.56 = −1
ipRouteMetric5.172.29.252.64 = −1
ipRouteMetric5.172.29.252.80 = −1
ipRouteMetric5.172.29.252.96 = −1
ipRouteMetric5.172.29.252.104 = −1

Column 13 ipRouteInfo.0.0.0.0 = 0.0
ipRouteInfo.127.0.0.0 = 0.0
ipRouteInfo.172.29.252.0 = 0.0
ipRouteInfo.172.29.252.32 = 0.0
ipRouteInfo.172.29.252.48 = 0.0
ipRouteInfo.172.29.252.56 = 0.0
ipRouteInfo.172.29.252.64 = 0.0
ipRouteInfo.172.29.252.80 = 0.0
ipRouteInfo.172.29.252.96 = 0.0
ipRouteInfo.172.29.252.104 = 0.0

TABLE C

Column 1 ipNetToMediaIfIndex.1.127.0.0.2 = 1
ipNetToMediaIfIndex.1.127.0.0.4 = 1
ipNetToMediaIfIndex.2.172.29.252.33 = 2
ipNetToMediaIfIndex.2.172.29.252.34 = 2
ipNetToMediaIfIndex.2.172.29.252.35 = 2
ipNetToMediaIfIndex.2.172.29.252.36 = 2
ipNetToMediaIfIndex.2.172.29.252.37 = 2
ipNetToMediaIfIndex.2.172.29.252.38 = 2
ipNetToMediaIfIndex.2.172.29.252.40 = 2
ipNetToMediaIfIndex.2.172.29.252.41 = 2
ipNetToMediaIfIndex.6.172.29.252.81 = 6
ipNetToMediaIfIndex.6.172.29.252.82 = 6
ipNetToMediaIfIndex.8.172.29.252.97 = 8
ipNetToMediaIfIndex.9.172.29.252.105 = 9

TABLE C-continued

Column 2 ipNetToMediaPhysAddress.1.127.0.0.2 = 00 90 6f 0a 43 ff
ipNetToMediaPhysAddress.1.127.0.0.4 = 00 e0 1e 92 1b ec
ipNetToMediaPhysAddress.2.172.29.252.33 = 00 90 bf a3 24 00
ipNetToMediaPhysAddress.2.172.29.252.34 = 00 10 7b 9a c5 91
ipNetToMediaPhysAddress.2.172.29.252.35 = 00 90 6f 0a 43 ff
ipNetToMediaPhysAddress.2.172.29.252.36 = 00 90 6f 0a 44 00
ipNetToMediaPhysAddress.2.172.29.252.37 = 00 80 24 71 b1 10
ipNetToMediaPhysAddress.2.172.29.252.38 = 00 90 ab 56 14 80
ipNetToMediaPhysAddress.2.172.29.252.40 = 00 aa 00 13 1e 5c
ipNetToMediaPhysAddress.2.172.29.252.41 = 00 a0 24 a6 61 8d
ipNetToMediaPhysAddress.6.172.29.252.81 = 00 90 bf a3 24 00
ipNetToMediaPhysAddress.6.172.29.252.82 = 00 10 7b cc 50 99
ipNetToMediaPhysAddress.8.172.29.252.97 = 00 90 bf a3 24 00
ipNetToMediaPhysAddress.9.172.29.252.105 = 00 90 bf a3 24 00

Column 3 ipNetToMediaNetAddress.1.127.0.0.2 = 127.0.0.2
ipNetToMediaNetAddress.1.127.0.0.4 = 127.0.0.4
ipNetToMediaNetAddress.2.172.29.252.33 = 172.29.252.33 ← (sb-rsm-1) ROUTER
ipNetToMediaNetAddress.2.172.29.252.34 = 172.29.252.34 ← (sb-4500-1) ROUTER
ipNetToMediaNetAddress.2.172.29.252.35 = 172.29.252.35 ← (not a router)
ipNetToMediaNetAddress.2.172.29.252.36 = 172.29.252.36 ← (not a router)
ipNetToMediaNetAddress.2.172.29.252.37 = 172.29.252.37 ← (not a router)
ipNetToMediaNetAddress.2.172.29.252.38 = 172.29.252.38 ← (not a router)
ipNetToMediaNetAddress.2.172.29.252.40 = 172.29.252.40 ← (not a router)
ipNetToMediaNetAddress.2.172.29.252.41 = 172.29.252.41 ← (not a router)
ipNetToMediaNetAddress.6.172.29.252.81 = 172.29.252.81
ipNetToMediaNetAddress.6.172.29.252.82 = 172.29.252.82
ipNetToMediaNetAddress.8.172.29.252.97 = 172.29.252.97
ipNetToMediaNetAddress.9.172.29.252.105 = 172.29.252.105

Column 4 ipNetToMediaType.1.127.0.0.2 = 4
ipNetToMediaType.1.127.0.0.4 = 1
ipNetToMediaType.2.172.29.252.33 = 1
ipNetToMediaType.2.172.29.252.34 = 3
ipNetToMediaType.2.172.29.252.35 = 3
ipNetToMediaType.2.172.29.252.36 = 3
ipNetToMediaType.2.172.29.252.37 = 3
ipNetToMediaType.2.172.29.252.38 = 3
ipNetToMediaType.2.172.29.252.40 = 3
ipNetToMediaType.2.172.29.252.41 = 3
ipNetToMediaType.6.172.29.252.81 = 1
ipNetToMediaType.6.172.29.252.82 = 3
ipNetToMediaType.8.172.29.252.97 = 1
ipNetToMediaType.9.172.29.252.105 = 1

What is claimed is:

1. A method for determining a path of a data packet in a managed network, the method comprising the steps of:
   determining that a first subnet associated with a source node of the network and a second subnet associated with a destination node of the network are different subnets;
   determining a first gateway used by the source node to reach a network management node of the network;
   determining a second gateway based on the first gateway and the destination node;
   determining whether the first subnet and a third subnet associated with the second gateway are identical subnets; and
   using the second gateway as a first hop in the path from the source node to the destination node when the first subnet and the third subnet associated with the second gateway are identical.

2. The method as recited in claim 1 further comprising determining that the destination node is one hop away when the first subnet associated with the source node and the second subnet associated with the destination node are identical.

3. The method as recited in claim 1 further comprising using the first gateway as the first hop from the source node to the destination node when the first subnet associated with the source node and the third subnet associated with the second gateway are not identical subnets.

4. The method as recited in claim 1 wherein determining that a first subnet associated with a source node and a second subnet associated with a destination node are different subnets further comprising:
   determining a subnet mask associated with the source node;
   performing a Bitwise AND operation on the subnet mask and a first IP address associated with the source node to produce a first result;
   performing the Bitwise AND operation on the subnet mask and a second IP address associated with the destination node to produce a second result; and
   determining that the first subnet and the second subnet are different subnets when the first result is different from the second result.

5. The method as recited in claim 4 wherein determining a subnet mask associated with the source node further comprises:

determining a router that has an interface on the first subnet; and determining the subnet mask associated with the source node from a routing table of the router that has the interface on the first subnet.

6. The method as recited in claim 5 wherein determining a router that has an interface on the first subnet associated with the source node further comprises performing an IP path tracing operation from the network management node to the source node.

7. The method as recited in claim 6 wherein performing an IP path tracing operation from the network management node to the source node further comprises performing a PING operation with a record route option from the network management node to the source node.

8. The method as recited in claim 6 wherein performing an IP path tracing operation from the network management node to the source node further comprises using a source-routed traceroute computer program to trace the IP path from the network management node to the source node.

9. The method as recited in claim 5 wherein determining the subnet mask associated with the source node from a routing table of the router that has the interface on the first subnet further comprises determining if there is a host route for the first IP address associated with the source node, and in response thereto, using the host route as an index for determining the subnet mask associated with the source node.

10. The method as recited in claim 5 wherein determining the subnet mask associated with the source node from a routing table of the router that has the interface on the first subnet further comprises:

performing the Bitwise AND operation on a first mask and the first IP address associated with the source node to produce a first iteration result; and using the first iteration result as an index for determining the subnet mask associated with the source node when the first iteration result matches any entry in a route destination field of the routing table.

11. The method as recited in claim 10, further comprising:

continuing to perform the Bitwise AND operation on a (1+N) mask and the first IP address associated with the source node to produce a (1+N) iteration result when the first iteration result does not match any entry in the route destination field of the routing table; and discontinuing to perform the Bitwise AND operation on the (1+N) mask and the first IP address associated with the source node and using the (1+N) iteration result as the index for determining the subnet mask associated with the source node when the (1+N) iteration result matches any entry in the route destination field of the routing table.

12. The method as recited in claim 11, further comprising using a default index for determining the subnet mask associated with the source node when the (1+N) iteration result does not match any entry in the route destination field of the routing table.

13. The method as recited in claim 1 wherein determining whether the first subnet associated with the source node and a third subnet associated with the second gateway and are identical subnets further comprises:

determining a subnet mask associated with the source node;

performing a Bitwise AND operation on the subnet mask and an IP address of the source node to produce a first result;

performing the Bitwise AND operation on the subnet mask and an IP address of the second gateway to produce a third result; and determining that the first subnet and the third subnet are not identical subnets when the first result is not identical from the third result.

14. The method as recited in claim 13 wherein determining a subnet mask associated with the source node further comprises:

determining a router that has an interface on the first subnet associated with the source node;

determining the subnet mask associated with the source node from a routing table of the router that has the interface on the first subnet associated with the source node.

15. The method as recited in claim 1 wherein determining a first gateway further comprises performing an IP path tracing operation from the network management node to the source node.

16. The method as recited in claim 15 wherein performing an IP path tracing operation from the network management node to the source node further comprises performing a PING operation with a record route option from the network management node to the source node.

17. The method as recited in claim 1 wherein determining a second gateway further comprises performing an IP path tracing operation from the first gateway to the destination node.

18. The method as recited in claim 17 wherein performing an IP path tracing operation from the first gateway to the destination node further comprises using a source-routed traceroute computer program to trace the IP path from the first gateway to the destination node.

19. A method for determining a path of a data packet in a managed network, the method comprising the steps of:

determining that a first subnet associated with a source node and a second subnet associated with a destination node are different subnets;

determining a set of all the routers that have an interface to the first subnet;

determining for each router of the set of all routers that have an interface to the first subnet a next hop from the router to the destination node;

determining whether the first subnet and a third subnet associated with the next hop from the router to the destination node are identical subnets;

discounting the router as a first hop from the source node to the destination node when the first subnet and the third subnet are identical; and using the router as the first hop from the source node to the destination node when the first subnet and the third subnet are not identical.

20. The method as recited in claim 19, further comprising determining that the destination node is one hop away when the first subnet associated with the source node and the second subnet associated with the destination node are identical subnets.

21. The method as recited in claim 19 wherein determining that a first subnet associated with a source node and a second subnet associated with a destination node are different further comprises:

determining a subnet mask associated with the source node;

performing a Bitwise AND operation on the subnet mask and a first IP address associated with the source node to produce a first result;

performing the Bitwise AND operation on the subnet mask and a second IP address associated with the destination node to produce a second result; and determining that the first subnet and the second subnet are different subnets when the first result is different from the second result.

22. The method as recited in claim 19 wherein determining a set of all routers that have an interface to the first subnet further comprises:

determining an ifIndex associated with the interface on the first subnet; and using the ifIndex for determining matching entries on a routing table.

23. The method as recited in claim 19 wherein determining a set of all routers that have an interface to the first subnet further comprises:

determining an ifIndex associated with the interface on the first subnet; and using the ifIndex for determining matching entries on a Address Resolution Protocol table.

24. The method as recited in claim 22 wherein determining an ifIndex associated with the interface on the first subnet further comprises:

performing the Bitwise AND operation on a first mask and the first IP address associated with the source node to produce a first iteration result;

determining a matching row in a route destination field of the routing table by comparing each row of the destination field of the routing table to the first iteration result; and using an entry in ifIndex field of the matching row on the routing table as the ifIndex associated with the interface on the first subnet.

25. The method as recited in claim 24, further comprising:

continuing to perform the Bitwise AND operation on a (1+N) mask and the first IP address associated with the source node to produce a (1+N) iteration result when the first iteration result does not match any row in the route destination field of the routing table;

discontinuing to perform the Bitwise AND operation on the (1+N) mask and the first IP address associated with the source node when the (1+N) iteration result matches a row in the route destination field of the routing table; and using an entry in the row in the route destination field of the routing table as the ifIndex associated with the interface on the first subnet.

26. The method as recited in claim 25, further comprising using an entry in the ifIndex field of a default row in the route destination field of the routing table as the ifIndex associated with the interface on the first subnet when the (1+N) iteration result does not match any row in the route destination field of the routing table.

27. The method as recited in claim 19 wherein determining whether the first subnet and a third subnet associated with the next hop from the router to the destination node are identical subnets further comprises:

determining a subnet mask associated with the source node;

performing a Bitwise AND operation on the subnet mask and an IP address of the source node to produce a first result;

performing the Bitwise AND operation on the subnet mask and an IP address of the next hop from the router to the destination node to produce a third result; and determining that the first subnet and the third subnet are not identical subnets when the first result is not identical to the third result.

28. The method as recited in claim 27 wherein determining a subnet mask associated with the source node further comprises:

determining a router that has an interface on the first subnet associated with the source node;

determining the subnet mask associated with the source node from the routing table of the router that has the interface on the first subnet associated with the source node.

29. A computer-readable medium carrying one or more sequences of one or more instructions for determining a path of a data packet in a managed network, the one or more sequences of one or more instructions including instructions which, when executed by one or more processors, cause the one or more processors to perform the steps of:

determining that a first subnet associated with a source node and a second subnet associated with a destination node are different subnets;

determining a first gateway used by the source node to reach a network management node;

determining a second gateway based on the first gateway and the destination node;

determining whether the first subnet associated with the source node and a third subnet associated with the second gateway are identical subnets; and using the second gateway as a first hop from the source node to the destination node when the first subnet associated with the source node and the third subnet associated with the second gateway are identical.

30. A computer-readable medium carrying one or more sequences of one or more instructions for determining a path of a data packet in a managed network, the one or more sequences of one or more instructions including instructions which, when executed by one or more processors, cause the one or more processors to perform the steps of:

determining that a first subnet associated with a source node and a second subnet associated with a destination node are different subnets;

determining a set of all the routers that have an interface to the first subnet;

determining for each router of the set of all routers that have an interface to the first subnet a next hop from the router to the destination node;

determining whether the first subnet and a third subnet associated with the next hop from the router to the destination node are identical subnets;

discounting the router as a first hop from the source node to the destination node when the first subnet and the third subnet are identical; and using the router as the first hop from the source node to the destination node when the first subnet and the third subnet are not identical.

31. An apparatus for determining a path of a data packet in a managed network, the apparatus comprising:

a storage medium; and a mechanism communicatively coupled to the storage medium, wherein the mechanism is configured to determine that a first subnet associated with a source node and a second subnet associated with a destination node are different subnets, determine a first gateway used by the source node to reach a network management node, determine a second gateway based on the first gateway and the destination node, determine whether the first subnet associated with the source node and a third subnet associated with the second gateway are identical subnets, and use the second gateway as a first hop from the source node to the destination node when the first subnet associated with the source node and the third subnet associated with the second gateway are identical.

32. An apparatus for determining a path of a data packet in a managed network, the apparatus comprising:

a storage medium; and a mechanism communicatively coupled to the storage medium, wherein the mechanism is configured to determine that a first subnet associated with a source node and a second subnet associated with a destination node are different subnets, determine a set of all the routers that have an interface to the first subnet, determine for each router of the set of all routers that have an interface to the first subnet a next hop from the router to the destination node, determine whether the first subnet and a third subnet associated with the next hop from the router to the destination node are identical subnets, discount the router as a first hop from the source node to the destination node when the first subnet and the third subnet are identical, and use the router as the first hop from the source node to the destination node when the first subnet and the third subnet are not identical.

33. The computer-readable medium as recited in claim 29 further comprising determining that the destination node is one hop away when the first subnet associated with the source node and the second subnet associated with the destination node are identical.

34. The computer readable medium as recited in claim 29 further comprising using the first gateway as the first hop from the source node to the destination node when the first subnet associated with the source node and the third subnet associated with the second gateway are not identical subnets.

35. The computer-readable medium as recited in claim 29 wherein determining a first gateway further comprises performing an IP path tracing operation from the network management node to the source node.

36. The computer-readable medium as recited in claim 35 wherein performing an IP path tracing operation from the network management node to the source node further comprises performing a PING operation with a record route option from the network management node to the source node.

37. The computer-readable medium as recited in claim 29 wherein determining a second gateway further comprises performing an IP path tracing operation from the first gateway to the destination node.

38. The computer-readable medium as recited in claim 30, further comprising determining that the destination node is one hop away when the first subnet associated with the source node and the second subnet associated with the destination node are identical subnets.

39. The computer-readable medium as recited in claim 30 wherein determining a set of all routers that have an interface to the first subnet further comprises:

determining an ifIndex value associated with the interface on the first subnet; and using the ifIndex value for determining matching entries on a routing table.

40. The computer-readable medium as recited in claim 30 wherein determining a set of all routers that have an interface to the first subnet further comprises:

determining an ifIndex value associated with the interface on the first subnet; and using the ifIndex value for determining matching entries on a Address Resolution Protocol table.

41. The computer-readable medium as recited in claim 39 wherein determining an ifIndex value associated with the interface on the first subnet further comprises:

performing the Bitwise AND operation on a first mask and the first IP address associated with the source node to produce a first iteration result value;

determining a matching row in a route destination field of the routing table by comparing each row of the destination field of the routing table to the first iteration result value; and using an entry in an ifIndex field of the matching row on the routing table as the ifIndex associated with the interface on the first subnet.

42. The computer-readable medium as recited in claim 41, further comprising:

continuing to perform the Bitwise AND operation on a (1+N) mask and the first IP address associated with the source node to produce a (1+N) iteration result when the first iteration result does not match any row in the route destination field of the routing table;

discontinuing performing the Bitwise AND operation on the (1+N) mask and the first IP address associated with the source node when the (1+N) iteration result matches a row in the route destination field of the routing table; and using an entry in the row in the route destination field of the routing table as the ifIndex value associated with the interface on the first subnet.

43. The computer-readable medium as recited in claim 42, further comprising using an entry in the ifIndex field of a default row in the route destination field of the routing table as the ifIndex value associated with the interface on the first subnet when the (1+N) iteration result does not match any row in the route destination field of the routing table.

* * * * *